(12) United States Patent
Han et al.

(10) Patent No.: US 10,592,138 B1
(45) Date of Patent: Mar. 17, 2020

(54) AVOIDING STORAGE DEVICE OVERLAP IN RAID EXTENT SUB GROUP AND KEEPING RELATIONSHIP BALANCE ON MAPPED RAID SYSTEM AND METHOD

(71) Applicant: EMC IP Holding Company, LLC, Hopkinton, MA (US)

(72) Inventors: Geng Han, Beijing (CN); Ilya Usvyatsky, Northborough, MA (US); Jian Gao, Beijing (CN); Jamin Kang, Beijing (CN); Jibing Dong, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 15/664,762

(22) Filed: Jul. 31, 2017

(51) Int. Cl.
*G06F 3/06* (2006.01)
(52) U.S. Cl.
CPC .......... *G06F 3/0631* (2013.01); *G06F 3/0604* (2013.01); *G06F 3/0689* (2013.01)

(58) Field of Classification Search
CPC ..... G06F 3/0604; G06F 3/0632; G06F 3/0689
See application file for complete search history.

(56) References Cited

U.S. PATENT DOCUMENTS

2017/0212705 A1* 7/2017 Kidney ................ G06F 3/0631

* cited by examiner

*Primary Examiner* — Ryan Bertram
*Assistant Examiner* — Edmund H Kwong
(74) *Attorney, Agent, or Firm* — Brian J. Colandreo; Mark H. Whittenberger; Holland & Knight LLP

(57) ABSTRACT

A method, computer program product, and computer system for adding, by a computing device, a plurality of disks in an extent pool to an available disk list. It may be determined, for a Mapped RAID group, that each RAID extent in a sub group has not been allocated. At least one RAID extent in the sub group may be allocated based upon, at least in part, determining that each RAID extent in a sub group has not been allocated.

9 Claims, 19 Drawing Sheets

800

1700a

1800

AVOIDING STORAGE DEVICE OVERLAP IN RAID EXTENT SUB GROUP AND KEEPING RELATIONSHIP BALANCE ON MAPPED RAID SYSTEM AND METHOD

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to adding, by a computing device, a plurality of disks in an extent pool to an available disk list. It may be determined, for a Mapped RAID group, that each RAID extent in a stab group has not been allocated. At least one RAID extent in the sub group may be allocated based upon, at least in part, determining that each RAID extent in a sub group has not been allocated.

One or more of the following example features may be included. It may be determined whether a disk extent in the available disk list is a first disk extent allocated for the at least one RAID extent. The disk list in the extent pool may be sorted by free disk extent count. Whichever disk from the available disk list that has a most freed disk extent may be selected as a candidate disk for allocation to the at least one RAID extent if the disk extent in the available disk list is the first disk extent allocated for the at least one RAID extent. Whichever disk from the available disk list that has a minimum score in the neighborhood matrix may be selected as a candidate disk for allocation to the at least one RAID extent if the disk extent in the available disk list is not the first disk extent allocated for the at least one RAID extent. The candidate disk may be removed from the available disk list after allocating the disk extent for the at least one RAID extent. The neighborhood matrix may be updated after allocating the disk extent for the at least one RAID extent.

In another example implementation, a computing system may include one or more processors and one or more memories configured to perform operations that may include but are not limited to adding, by a computing device, a plurality of disks in an extent pool to an available disk list. It may be determined, for a Mapped RAID group, that each RAID extent in a sub group has not been allocated. At least one RAID extent in the sub group may be allocated based upon, at least in part, determining that each RAID extent in a sub group has not been allocated.

One or more of the following example features may be included. It may be determined whether a disk extent in the available disk list is a first disk extent allocated for the at least one RAID extent. The disk list in the extent pool may be sorted by free disk extent count. Whichever disk from the available disk list that has a most freed disk extent may be selected as a candidate disk for allocation to the at least one RAID extent if the disk extent in the available disk list is the first disk extent allocated for the at least one RAID extent. Whichever disk from the available disk list that has a minimum score in the neighborhood matrix may be selected as a candidate disk for allocation to the at least one RAID extent if the disk extent in the available disk list is not the first disk extent allocated for the at least one RAID extent. The candidate disk may be removed from the available disk list after allocating the disk extent for the at least one RAID extent. The neighborhood matrix may be updated after allocating the disk extent for the at least one RAID extent.

In another example implementation, a computer program product may reside on a computer readable storage medium having a plurality of instructions stored thereon which, when executed across one or more processors, may cause at least a portion of the one or more processors to perform operations that may include but are not limited to adding, by a computing device, a plurality of disks in an extent pool to an available disk list. It may be determined, for a Mapped RAID group, that each RAID extent in a sub group has not been allocated. At least one RAID extent in the sub group may be allocated based upon, at least in part, determining that each RAID extent in a sub group has not been allocated.

One or more of the following example features may be included. It may be determined whether a disk extent in the available disk list is a first disk extent allocated for the at least one RAID extent. The disk list in the extent pool may be sorted by free disk extent count. Whichever disk from the available disk list that has a most freed disk extent may be selected as a candidate disk for allocation to the at least one RAID extent if the disk extent in the available disk list is the first disk extent allocated for the at least one RAID extent. Whichever disk from the available disk list that has a minimum score in the neighborhood matrix may be selected as a candidate disk for allocation to the at least one RAID extent if the disk extent in the available disk list is not the first disk extent allocated for the at least one RAID extent. The candidate disk may be removed from the available disk list after allocating the disk extent for the at least one RAID extent. The neighborhood matrix may be updated after allocating the disk extent for the at least one RAID extent.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
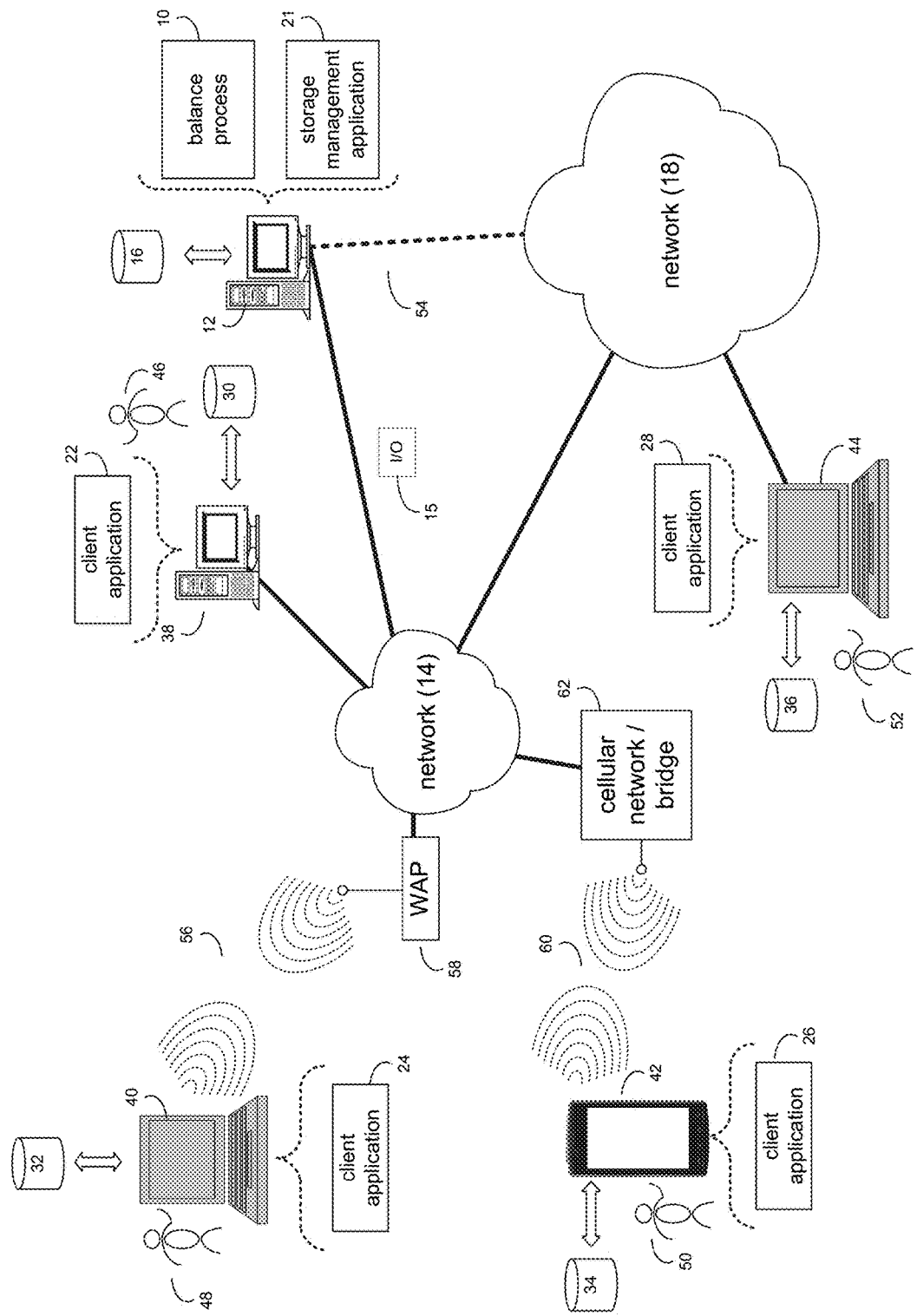
FIG. 1 is an example diagrammatic view of a balance process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown balance process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc, in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a balance process, such as balance process 10 of FIG. 1, may add, by a computing device, a plurality of disks in an extent pool to an available disk list. It may be determined, for a Mapped RAID group, that each RAID extent in a sub group has not been allocated. At least one RAID extent in the sub group may be allocated based upon, at least in part, determining that each RAID extent in a sub group has not been allocated.

In some implementations, the instruction sets and subroutines of balance process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, balance process 10 may be a component of the data store, a standalone application that interfaces with the above noted data store and/or an applet/application that is accessed via client applications 22, 24, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, balance process 10 and/or storage management application 21 may be accessed via one or more of client applications 22, 24, 26, 28. In some implementations, balance process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within balance process 10, a component of balance process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of balance process 10 and/or storage management application 21, Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of balance process 10 (and vice versa). Accordingly, in some implementations, balance process 10 may be a purely server-side application, a purely client-side application, or a hybrid server-side/client-side application that is cooperatively executed by one or more of client applications 22, 24, 26, 28 and/or balance process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, balance process 10, and storage management application 21, taken singly or in any combination, may effectuate some or all of the same functionality, any description of effectuating such functionality via one or more of client applications 22, 24, 26, 28, balance process 10, storage management application 21, or combination thereof, and any described interaction(s) between one or more of client applications 22, 24, 26, 28, balance process 10, storage management application 21, or combination thereof to effectuate such functionality, should be taken as an example only and not to limit the scope of the disclosure.

In some implementations, one or more of users 46, 48, 50, 52 may access computer 12 and balance process 10 (e.g., using one or more of client electronic devices 38, 40, 42, 44) directly through network 14 or through secondary network 18. Further, computer 12 may be connected to network 14 through secondary network 18, as illustrated with phantom link line 54. Balance process 10 may include one or more user interfaces, such as browsers and textual or graphical user interfaces, through which users 46, 48, 50, 52 may access balance process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.1.1x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer and data read requests (e.g., a request that content be read from computer 12).

Figure 2:
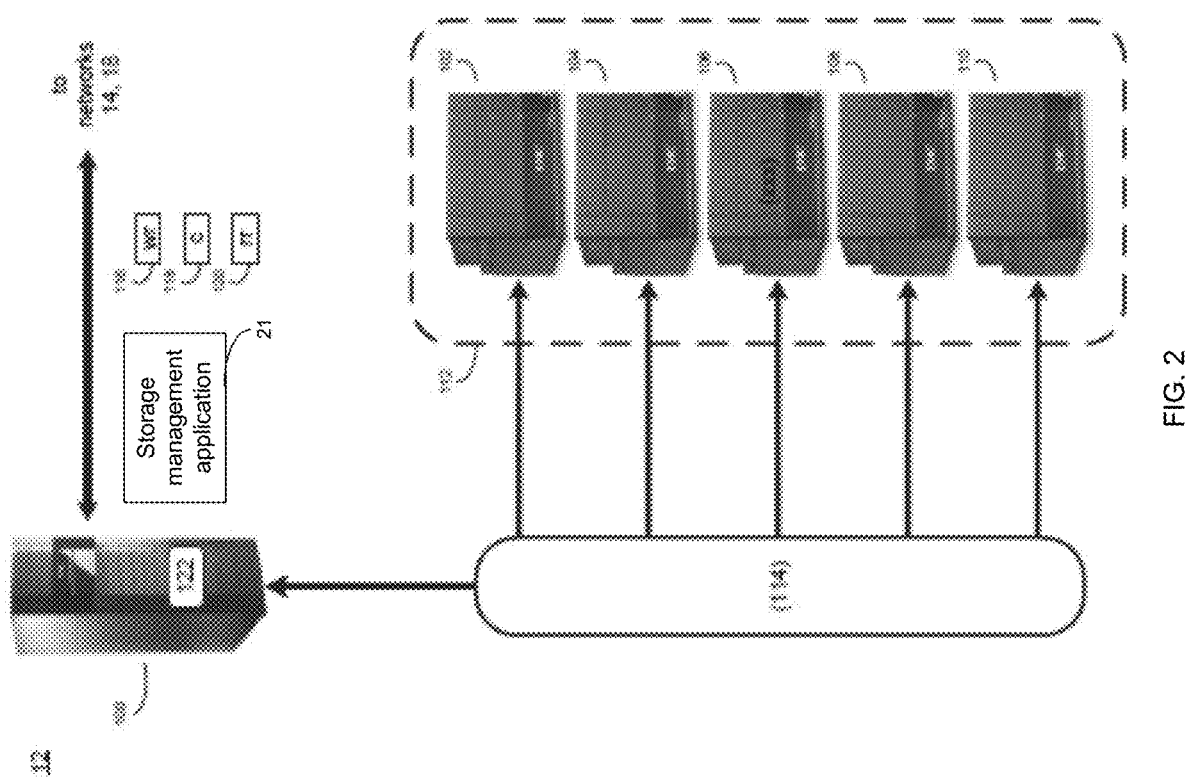
FIG. 2 is an example diagrammatic view of a computer of FIG. 1 according to one or more example implementations of the disclosure.
Figure 3:
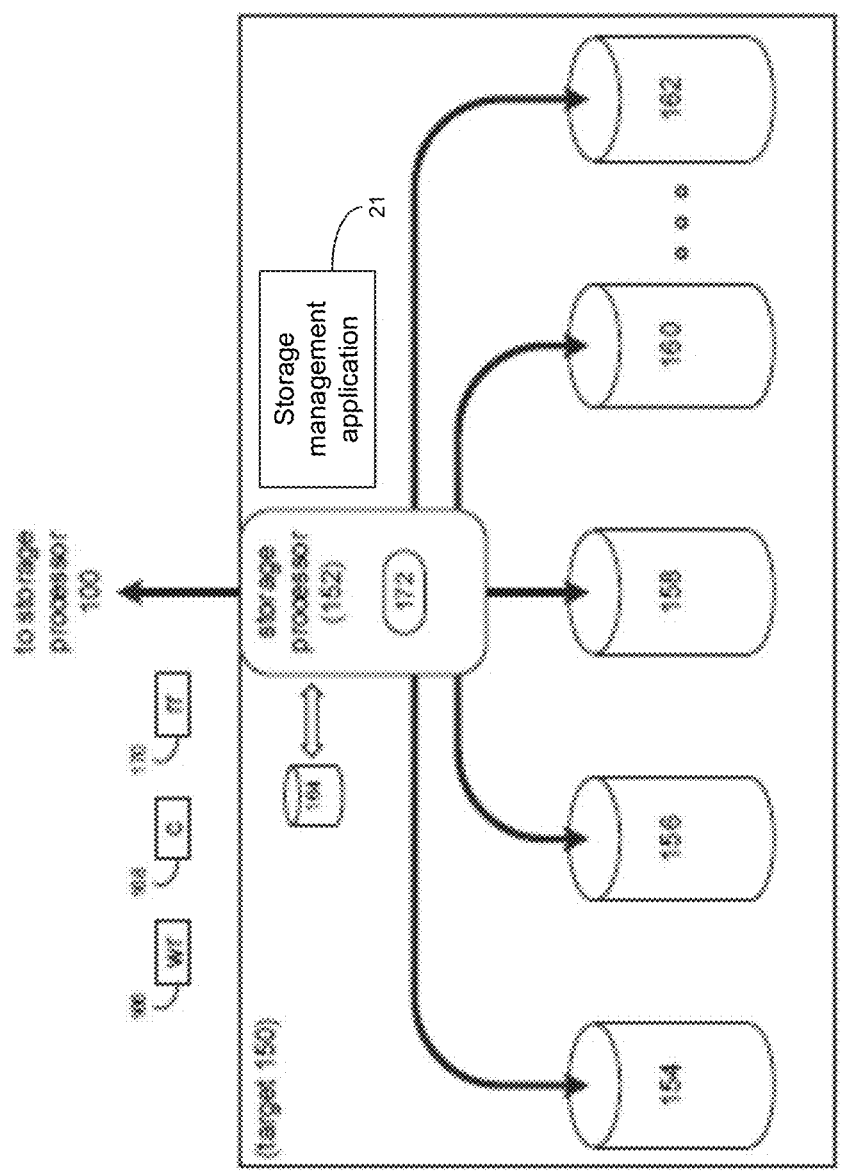
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above; various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations; during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or balance process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices.

In some implementations, target 150 may include storage processor 152 and a plurality of storage devices storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only, and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Figure 4:
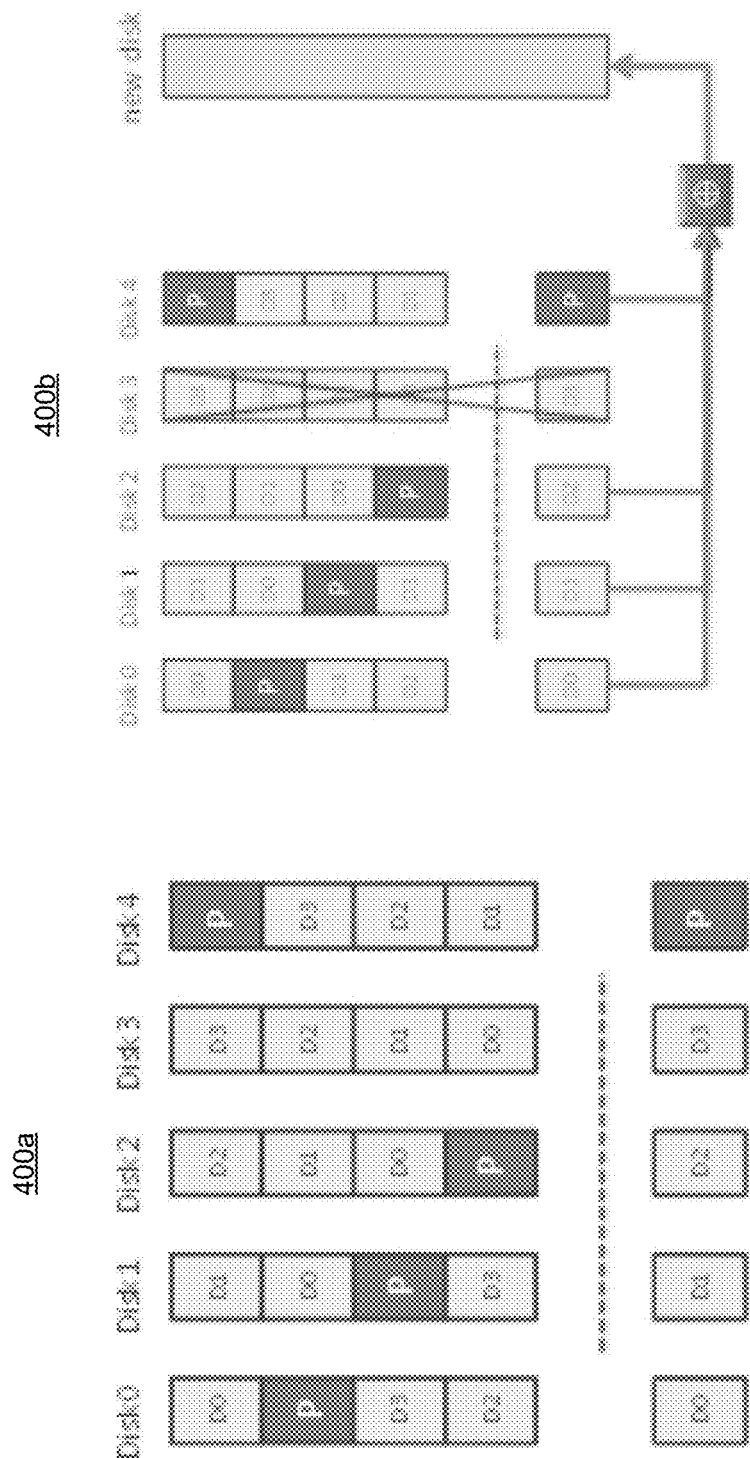
FIG. 4 is an example diagrammatic view of a RAID layout of FIG. 1 according to one or more example implementations of the disclosure.

Example RAID Group:

As discussed above, and referring at least to the example implementation of FIG. 4, an example 4D+1P RAID 5 layout 400a that may be managed (e.g., via storage management application 21) is shown. In the example, data may be distributed across the storage devices (e.g., drives) in one of several ways, referred to as RAID levels, depending on the required level of redundancy and performance. As noted above, while one or more of the figures may shows disks as the storage device, it will be appreciated that any of the storage devices discussed throughout may be used.

Shown for example purposes only, RAID 5 may consist of block level striping with distributed parity. Parity information may be distributed among the drives. In the above example, each stripe may consist of five blocks, which may include four data blocks (e.g., D0, D1, D2, D3) and one parity block (e.g., P). Upon failure of a single drive, subsequent reads may be calculated from the distributed parity such that no data is lost. At the same time, a "hot spare" storage device may be selected to replace the dead storage device, and all the data on the failed drive may be rebuilt and written to the new drive. For instance, and referring at least to the example implementation of FIG. 4, an example RAID 5 rebuild 400b of the example 4D+1P RAID 5 layout of 400a is shown.

As storage device capacity increases, the rebuild time may also increase. As a result, there may be an increased risk of a double storage device failure, which may lead to data loss. It will be appreciated that the rebuild time may be subject to the write bandwidth of the hot spare storage device, which may become a bottleneck. In some situations, it may be difficult to reduce the rebuild time for RAID. In some implementations, Mapped RAID technology have help resolve this issue.

Figure 5:
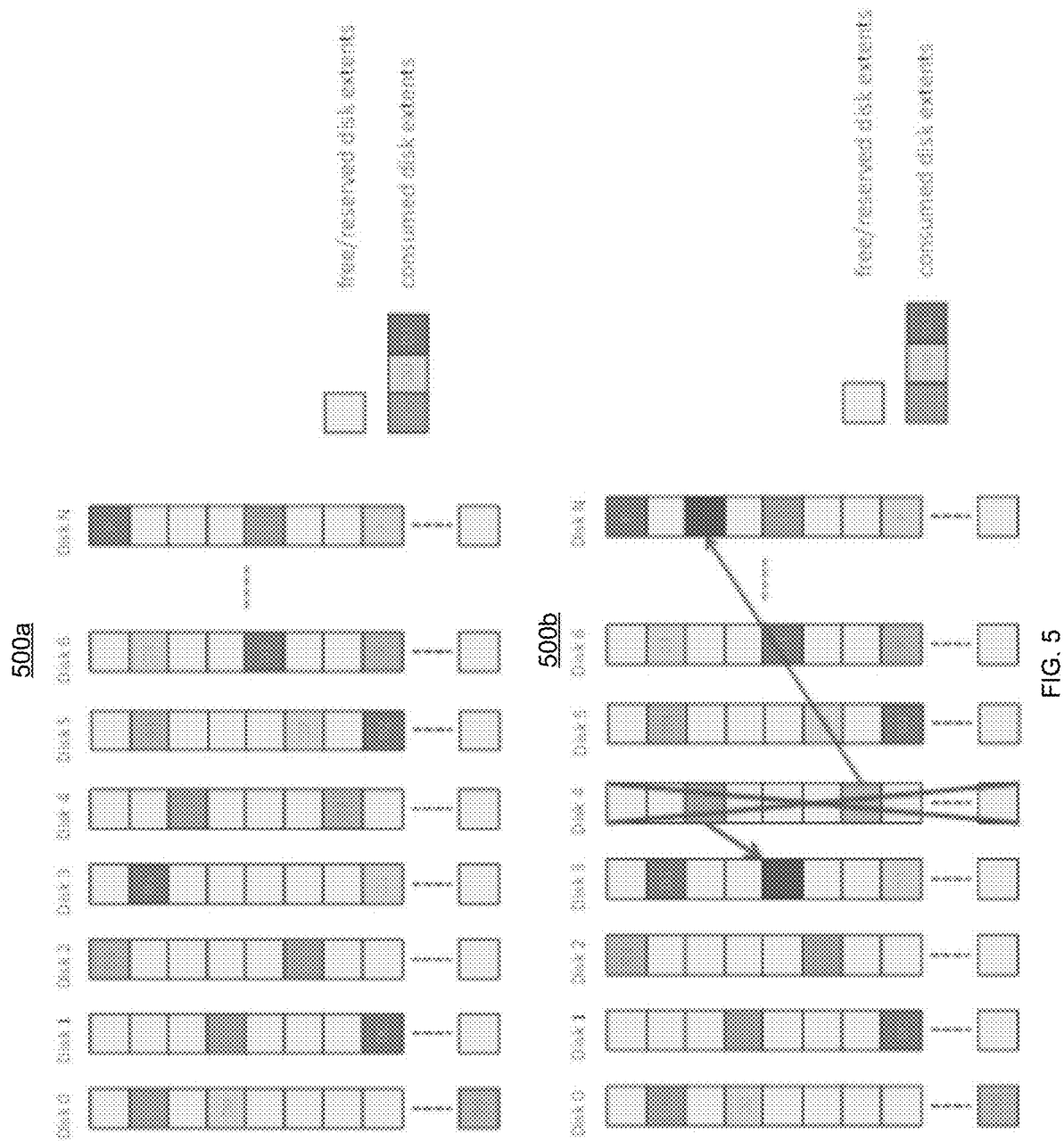
FIG. 5 is an example diagrammatic view of a Mapped RAID extent layout of FIG. 1 according to one or more example implementations of the disclosure.

Example Mapped RAID Group:

In some implementations, and referring at least to the example implementation of FIG. 5, an example Mapped RAID extent layout 500a managed (e.g., via storage management application 21) is shown (e.g., a 4D+1P RAID 5 over N disks, where N is greater than 5). Generally, Mapped RAID may be created on top of a disk (or other storage device) pool, which may include N disks (or other storage devices) Broadly speaking, each disk may be viewed as a set of continuous, non-overlapping, fixed sized disk extents. In the example of FIG. 5, while creating a RAIL) extent, 5 disk extents may be selected from 5 different disks. Some disk extents on each disk may be reserved as hot spare disk extents (e.g., instead of reserving the whole disk as a hot spare disk, which may be typical with a traditional RAID group).

Generally, it may be expected that storage management application 21 may evenly distribute the RAID extents to all disks in the pool, and further expected that all disk space is consumed no matter whether their capacity is the same or not. Typically, when one disk fails, the replacement may be found from other live disks for each disk extent on the dead drive. For instance, and referring at least to the example implementation of FIG. 5, an example disk extent replacement during disk fail in Mapped RAID layout 500b of the example Mapped RAID extent layout 500a is shown. Generally, an example limitation for the disk extents selection may be that there should be a guarantee that each RAID extent straddles 5 different disks (e.g., assuming the layout in 5). Moreover, storage management application 21 may be expected to distribute the dead disk extent replacements evenly to live disks.

Example Mapped RAID Rebuild Performance Consideration

As shown in FIG. 5, with Mapped RAID, the example limitation of having the single spare disk write bandwidth may be resolved, since storage management application 21 may replace dead disk extents with extents on different disks. Generally, if better rebuild performance is desired, as many disks as possible should be enabled to participate in the rebuilding procedure. In some implementations, a way to achieve this may be for storage management application 21 to evenly distribute Mapped. RAID extents to all the disks in the pool while creating the mapped RAID.

Example RAID Extent Layout

In some implementations, one Mapped RAID group may be a set of ordered RAID extents. When creating a Mapped RAID group, storage management application 21 may need to allocate many RAID extents from the extent pool. As noted above, one RAID extent may need a RAID width number of disk extents from different disks in the extent pool. Generally, storage management application 21 may allocate the RAID extents one by one. For ease of explanation only, assume the disk number in the pool is N, and the RAID extent width is M. In the example, there should be $C_n^m$ possible ways to combine a RAID extent. A typical case may be for storage management application 21 to create 4D+1P mapped RAID 5 on top of 16 disks, where there are $C_{16}^8=4368$ ways to allocate a RAID extent on top of 16 disks. In some implementations, for each RAID extent allocation, storage management application 21 may loop over all the possible choices, and select the best one. In the example, the searching depth may be $C_n^m$.

Example Pool with Hybrid Disk Capacities:

In some implementations, it may be desirable to have the disks with different capacities to coexist on a disk pool; however, generally, the more common scenario may be that with the passage of time, the disk pool, upon which Mapped RAID may be based, may be replaced or disks with different capacities may be added due to, e.g., sparing or expansion. Generally, there may be some approaches to address this issue. For example, the first approach may include grouping the disks by capacity, and laying out RAID extents on the respective groups. This may require a minimal size for each group, which may result in a minimal disk count limitation for each capacity. As another example, a second approach may include using the larger disk as a smaller one before reaching the minimal count, but this may result in some wasted disk capacity.

Example Mapped Raid Reliability Model:

As noted above, a failed drive may be rebuilt and written to the new drive, and the rebuild time may be subject to the write bandwidth of the hot spare storage device, which may become a bottleneck. In some situations, it may be difficult to reduce the rebuild time for RAID. Generally, a rebuild failure may occur in one or more ways. For example, one way may be when additional drives fail completely exceeding the capability of the parity protection scheme to compensate for the failures (e.g., one additional drive for RAID 5 and two additional drives for RAID 6, etc.).

Another example way may be when data on a drive (or two drives in the case of RAID 6, etc.) needed to perform some portion of the rebuild cannot be reliably read (though the drive itself may not have failed). This example may be proportional to the amount of data that needs to be read during the rebuild and may be independent of the number of drives that need to be read. For example, the failure of a 1 terabyte (TB) drive in a 4±1 RAID 5 may require 4 TB of data to be read from the remaining drives, regardless of whether that 4 TB is read from 4 drives or 40 drives. As such, in terms of comparing the rebuild failure rates between Mapped RAID and "traditional" RAID, the second one may be the same when rebuilding a given size drive and only the first one needs to be looked at for differences.

Generally, the probability of N drives staying alive during rebuild time may be the probability of an individual drive not failing during the rebuild time to the power of N. An example formula for this may be:

$$P=EXP(-RT/MTTF)^N$$

Where,

EXP=e (the base of the natural logarithm) raised to the given power
N=the number of drives involved in the rebuild
RT=the rebuild time
MTTF=the mean time to drive failure As can be seen from the above example formula, as the number of drives used to perform the rebuild increases, the rebuild time must decrease (i.e., the rebuild rate must increase) to compensate.

For instance, assume for example purposes only a 4+1 RAID 5 RAID group including 1 TB drives with a MITT of 1.2 million hours and a rebuild rate of 40 MB/s. For traditional RAID, the probability of the rebuild completing without another drive failing may be:

$$P=EXP(-(1\ TB*1024\ GB/TB*1024\ MB/GB/40\ MB/sec/(1{,}200{,}000\ hours*3600\ sec/hours))^4=0.999976$$

Thus, for Mapped RAID with, e.g., 49 drives used for the rebuild:

$$0.999976 <= EXP(-(1*1024*1024/<\text{rebuild rate}>)/(1,200,000*3600))^{49}$$

In this example, solving for the rebuild rate may yield a required rebuild rate of approximately 500 MB/s. Thus, as long as Mapped RAID gets a rebuild rate of at least 500 MB/s using 49 drives (which may be a 12.5× improvement over the rebuild rate using 4 drives), the probability of the rebuild failing due to a drive failure is no worse for Mapped RAID than for traditional RAID. In some implementations, and based on some measurements, using less drives (e.g., 43 drives) for a rebuild may achieve, e.g., a 20× rebuild rate improvement.

Example Disk Partner Group (DPG):

In a Drive Extent Pool, there may be a limit to how many "partners" a particular drive may have. Broadly defined, a partner of a given drive may be any drive with a drive extent in any RAID extent that also includes a drive extent from the given drive. This may result in segmenting a large Drive Extent Pool into drive partnership sets, for which this limitation may be due to the increased probability that a drive needed for a rebuild fails during the rebuild. For example, in a 4+1 RAID 5 configuration, a drive with, e.g., 100 drive extents may, without such a limit, have those drive extents in RAID extents that also include drive extents from, e.g., 400 other drives. As such, should that drive fail, the rebuild process (e.g., via storage management application 21) may have to access portions of those 400 drives in order to perform the rebuild. Requiring such a large number of drives may increase the probability that a drive needed for the rebuild fails during the rebuild.

Figure 6:
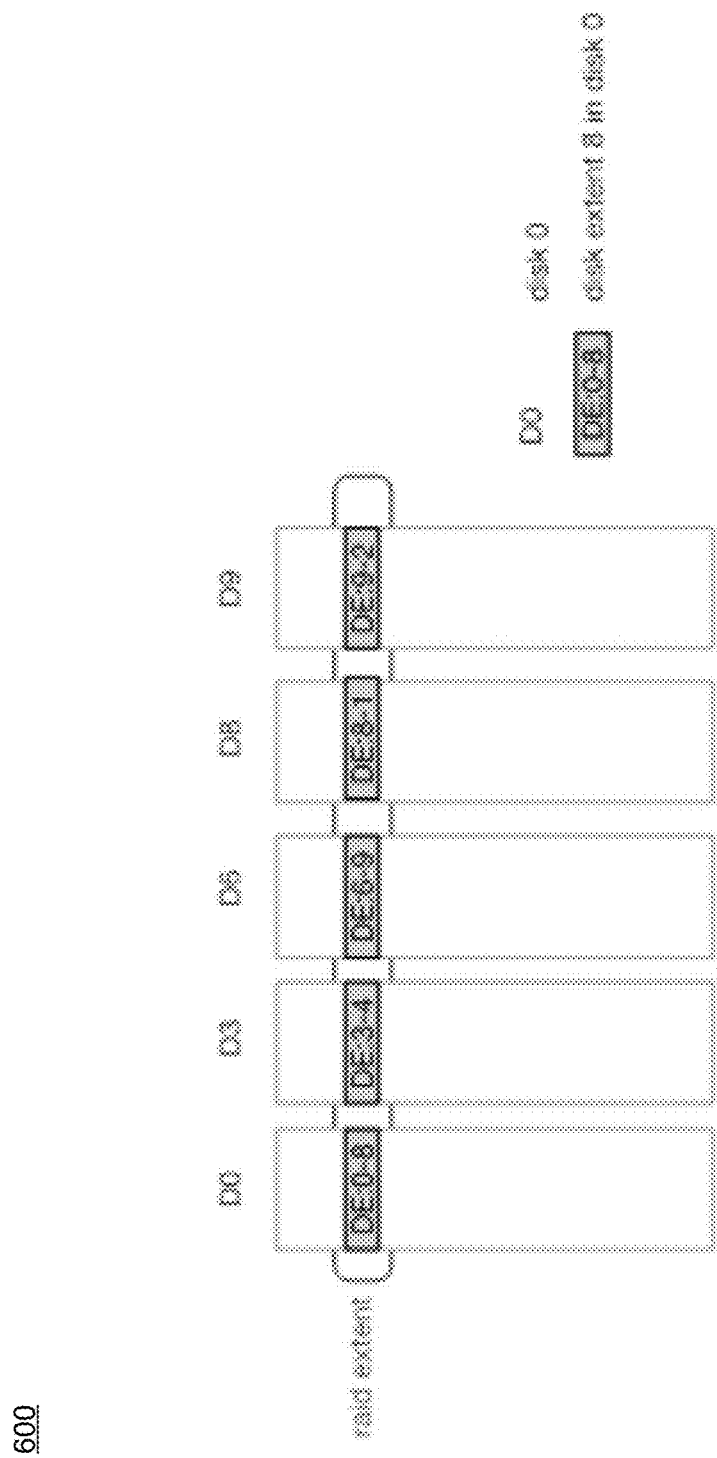
FIG. 6 is an example diagrammatic view of a disk relationship layout of FIG. 1 according to one or more example implementations of the disclosure.

Example Neighborhood Matrix:

In some implementations, storage management application 21 may evaluate whether or not the RAID extents distribution is even among the storage devices, which may be accomplished using a "neighborhood matrix." For example, and referring at least to the example implementation of FIG. 6, an example disk relationship layout 600 is shown. Generally, a neighborhood matrix may be described as an N*N square matrix, where N is the number of disks in the pool. Each number in the matrix may be denoted as NM(i, j), which stands for how many times disk i has ever neighbored with disk j. While allocating a RAID extent, storage management process 10 may select some disk extents from different disks. In some implementations, storage management process 10 may define disks in the RAID extent neighbors with each other one time. Generally, the matrix should be a symmetric matrix, since with the example definition of "neighbor," NM(i, j) should be equal to NM(j, i). As shown in FIG. 6, storage management application 21 may combine 5 disk extents that may be from 5 different disks together into one RAID extent, After the RAID extent is created, storage management application 21 may generally count these 5 disk neighbors each other one time. For example, disk_0 is neighbors with disk_3 one time, disk_3 is neighbors with disk_9 one time, etc.

Figure 7:
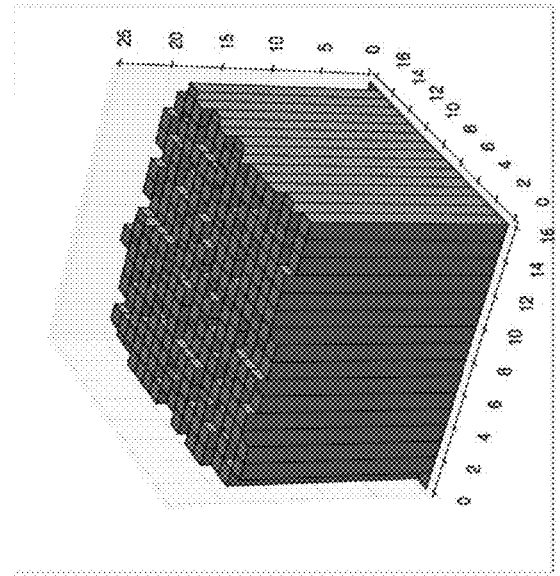
FIG. 7 is an example diagrammatic view of matrices according to one or more example implementations of the disclosure.
Figure 7:
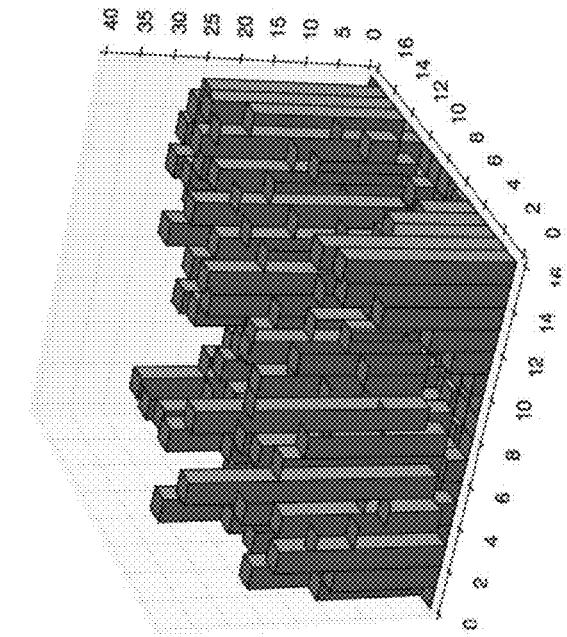

Matrix Examples:

Referring at least to the example implementation of FIG. 7, an example of a "good" example matrix 700a and of a "bad" example matrix 700b is shown. In good example matrix 700a, the numbers in the matrix are closer to each other, which may range from, e.g., 19 to 21 in this example. In the bad example matrix 700b, there is shown a significant difference between the numbers in the matrix, and even worse, some numbers are zero, which means that some disks never neighbor with each other. Therefore, in this example, if one disk fails, some disks may not participate the rebuilding procedure.

Example Weighted Neighborhood Matrix:

Generally, when the above-noted neighborhood matrix is "flat," the "neighbor times" between disks are similar, meaning storage management application 21 may allocate similar disk extent counts from each disk no matter what the real disk capacity is. For a pool with hybrid disk capacity, this may waste large amounts of disk capacity.

In some implementations, to take into account the disk capacity factor, storage management application 21 may make use of a Weighted Neighborhood Matrix (WNM) defined below by example:

$$WNM_{i,j} = NM_{i,j} * S_{typical} * S_{typical}/(S_i * S_j), \text{ where}$$

$S_{typical}$: defined generally as the typical disk size in the pool, which may be minimal or other typical disk size in the pool.

$S_i, S_j$: defined generally as the size of the i-th or j-th disk in the pool.

With this weighted neighborhood matrix, storage management application 21 may normalize a larger disk's "neighborhood times" with other disks by a typical disk size. Therefore, storage management application 21 may allocate more extents from this disk to make the matrix more "flat." In some implementations, if storage management application 21 evenly distributes the RAID extents to disks in the pool with the bias to larger disks, values in the matrix may be closer to each other. Therefore, storage management application 21 may use an algorithm, which may make values in the weighted neighborhood matrix almost the same after completing the RAID extents allocation.

Mapped RAID Position in the I/O Stack

Figure 8:
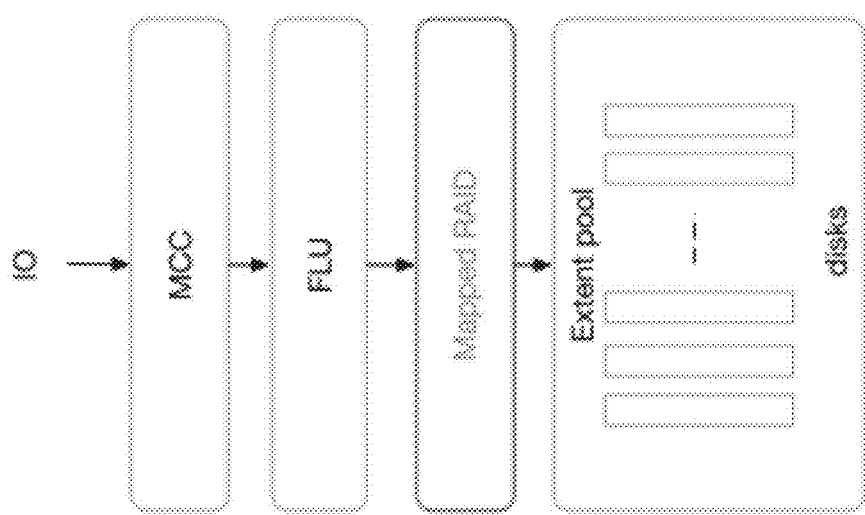
FIG. 8 is an example diagrammatic view of an example Mapped RAID position in an I/O stack according to one or more example implementations of the disclosure.

Referring at least to the example implementation of FIG. 8, an example Mapped RAID position in an I/O stack 800 is shown. As noted above, Mapped RAID may be generally created on top of an extent pool, which is a collection of disks (or other storage device type). The space of Mapped RAID may be exposed to a multi-core cache (MCC) through a Flare LUN (FLU). MCC in the storage system may act as a buffer cache. Memory in the MCC may be organized into memory pages. A memory page may be, e.g., an 8 KB size. Generally, when a mite I/O is sent to the MCC, the I/O data may be copied to the MCC's memory pages, and then the write I/O may be completed. When the free page number reaches a certain level, a background flush may be triggered. The MCC may flush dirty pages sequentially in logical block address (LBA) increasing order. Thus, the MCC flush I/O pattern may be sequentially oriented. Generally, the host sends the 8K random write I/O to the MCC, and the MCC may reorganize these random host I/Os to sequentially flush the I/Os and send down to the FLU. This kind of behavior for the MCC's may require that the FLU and Mapped RAID should optimize sequential write I/O performance.

Mapped RAID Extent Sub Group

Regarding Mapped RAID design, Mapped RAID extent sub groups may be used. For example, each RAID extent sub group may include several RAID extents, and generally, the RAID extent index in the sub group should be continuous. Typically, storage management application 21 may implement a Logical Block Address (LBA) rotation algorithm in the FLU and Mapped raid level. Data may be distributed among RAID extent sub groups, and in each sub group, data may be distributed to each RAID extent. With this algorithm, sequential I/O sent to the FLU and Mapped RAID may also be keep sequential on the disks.

Thus, Mapped RAID may be generally described as being composed of RAID extent sub groups; Raid extent sub groups may be generally described as being composed of some continuous RAID extents; RAID extents may be generally described as being composed of disk extents, where the disk extents should generally come from different disks; disks may be generally described as being composed continuous, none overlapping and equal sized disk extents; Disk extent pool may be generally described as being composed of disks, and also a collection of disk extent resources.

Generally, as may be required by the LBA rotation algorithm of storage management application 21, a RAID extent sub group should generally meet the following rules:

Each RAID extent sub group may include several RAID extents, and the RAID extent index in the sub group should generally be continuous.

The RAID extent count in each sub group may depend on the extent pool width (how many disks it includes) and RAID extent width (how many disk extents it includes).

Generally, RAID extent count=FLOOR(poll width/raid extent width).

All RAID extents in the sub group should generally have no overlaps on disk.

After allocating RAID extents and binding them to a sub group, the neighborhood matrix should be keep balanced, generally meaning that disk relationships in the disk extent pool should be kept almost the same.

LBA Rotation Among RAID Extents

Generally, e.g., on a HDD disk, sequential I/O has a better performance than non-sequential I/O, since non-sequential I/O may have to move the disk head back and forth. So as to get a better sequential write I/O performance, the I/O eventually be sent to disk may also keep sequential after the FLU and Mapped RAID handles the original sequential flush I/O.

Figure 9:
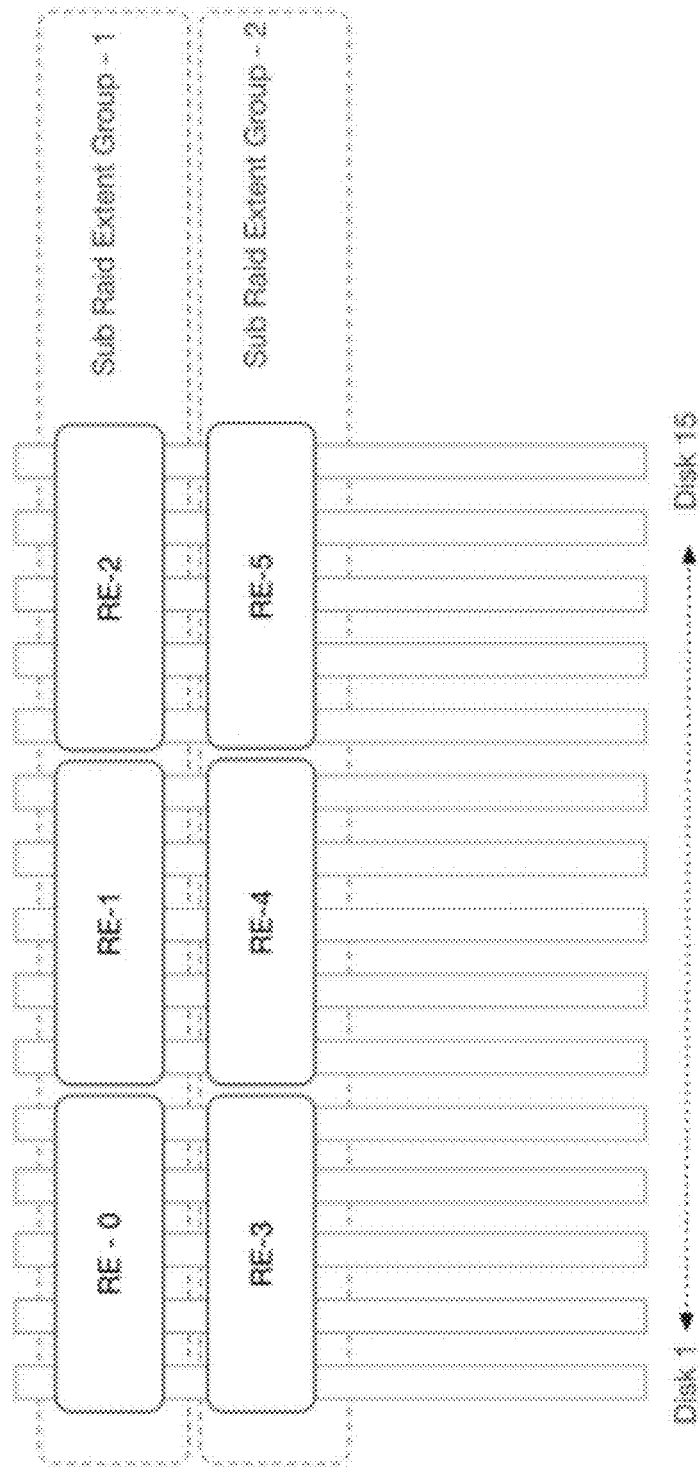
FIG. 9 is an example diagrammatic view of a RAM extent sub group layout according to one or more example implementations of the disclosure.

In some implementations, for Mapped RAID, storage management application 21 may keep all disks in the extent pool the same hot level. That may require that I/Os be evenly distributed among disks no matter if the I/O pattern received by the FLU is sequential or random. Random I/O by nature may be distrusted evenly among the disks. But for sequential I/O, alternative designs may be used. For example, and referring at least to the example implementation of FIG. 9, an example RAID extent sub group layout 900 is shown. In the example, each raid extent sub group may include several RAID extents. In the example, each raid extent sub group may include, three RAID extents and the RAID extent is a 4+1 RAID 5 (R5). In the example, all 15 disks in the extent pool are covered by one sub RAID extent group. In the example, all the RAID extents in the sub RAID extent group have no overlaps on a disk.

Figure 10:
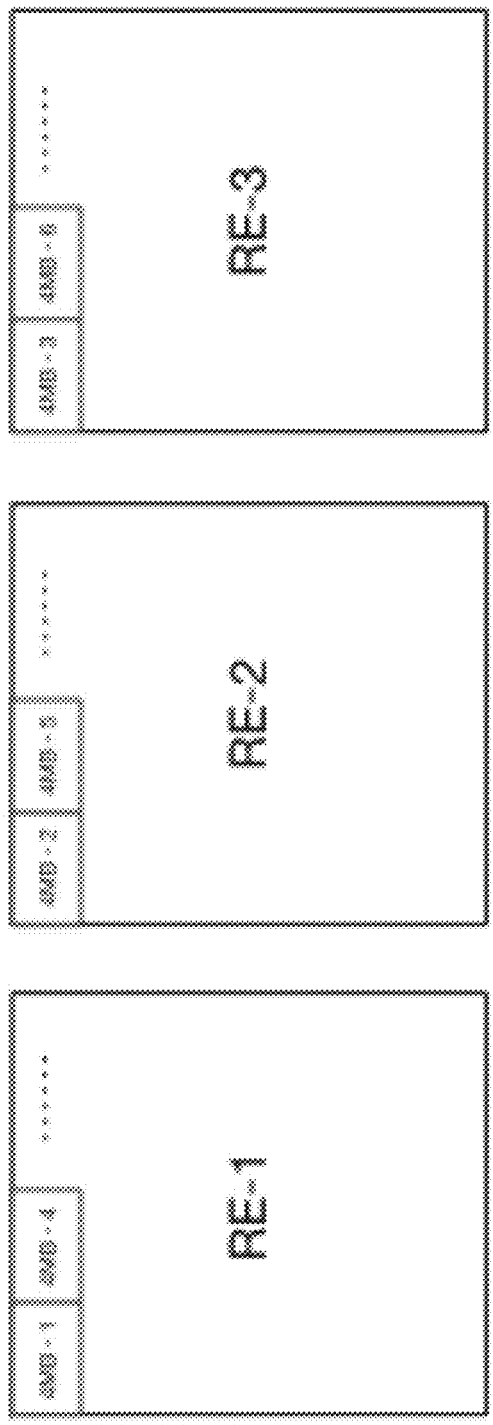
FIG. 10 is an example diagrammatic view of a Mapped RAID LBA rotation according to one or more example implementations of the disclosure.

Sequential I/O may be rotated among the RAID extents in the sub group. For example, the first, e.g., 4 MB data may be saved in the first RAID extent, the next 4 MB data may be saved in the second RAID extent, the next 4 MB data may be saved in the third RAID extent, and next 4 MB data may be saved in first RAID extent again. In this way, storage management application 21 may treat the sub RAID extent group as a R50, as shown in the Mapped RAID LBA rotation 1000 in example FIG. 10. Generally, with this design, sequential I/Os may be evenly distributed to the disks, and I/Os on each disk may also keep sequential. So, in this way, there may be no sequential I/O performance degradation on the HDD disks.

Figure 11:
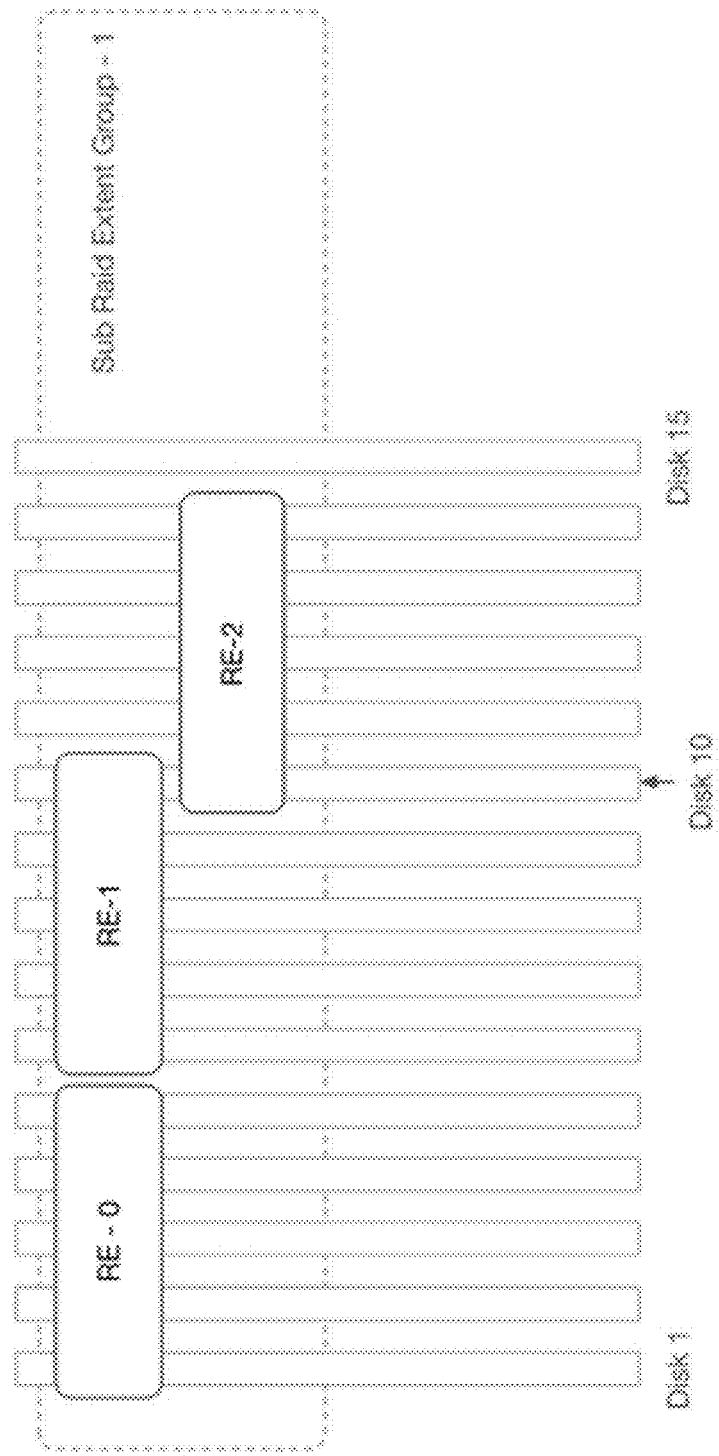
FIG. 11 is an example diagrammatic view of an overlap in a RAID extent sub group according to one or more example implementations of the disclosure.

There may be some cases that violate the non-overlap requirements, and there may be I/O performance drop issues with overlapping on disks. For example, and referring at least to FIG. 11, and example overlap in a RAID extent sub group 1100 is shown. In the example, if there are overlaps on one disk between two RAID extents, I/O on this disk may not be kept sequential. For instance, in the example, both RAID extent 1 and RAID extent 2 include disk_10. Thus, while distributing sequential I/O among three RAID extents in the sub raid extent group 1, I/O on disk_10 may be bouncing between the area covered by RAID extent 1 and the area covered by RAID extent 2. So, there may be observed I/O performance dropping on disk_10. On the other hand, a slow disk_10 may impact both I/O performance on RAID extent 1 and RAID extent 2, and the overall I/O performance in sub RAID extent group 1 may also be impacted.

There may be some cases to introduce overlap on disks. For instance, there may be some cases that may break the rule that there are no overlaps on disks among RAID extents in one sub group. Consider an example case with disk failure. When one disk fails, disk extents on the failed disk may be spared to free disk extents on other live disks (e.g., replaced by free disk extents on other live disks). But if the live disk count in the extent pool is smaller than the minimum disk count that no overlapped sub RAID extent group requires, overlaps on some disk may not be avoidable after the spare is done.

For instance, assume for example purposes only that the disk extent pool includes 15 disks, and the RAID extent is 4+1 R5, and each sub RAID extent group has three raid extents. In this example, it may be possible that all 15 disk extents in the sub group come from 15 different disks. But if one disk fails, there are only 14 disks left to allocate 15 disk extents, and storage management application 21 may have to allocate two disk extents from one disk. Thus, RAID extents will have overlap on this disk.

Figure 12:
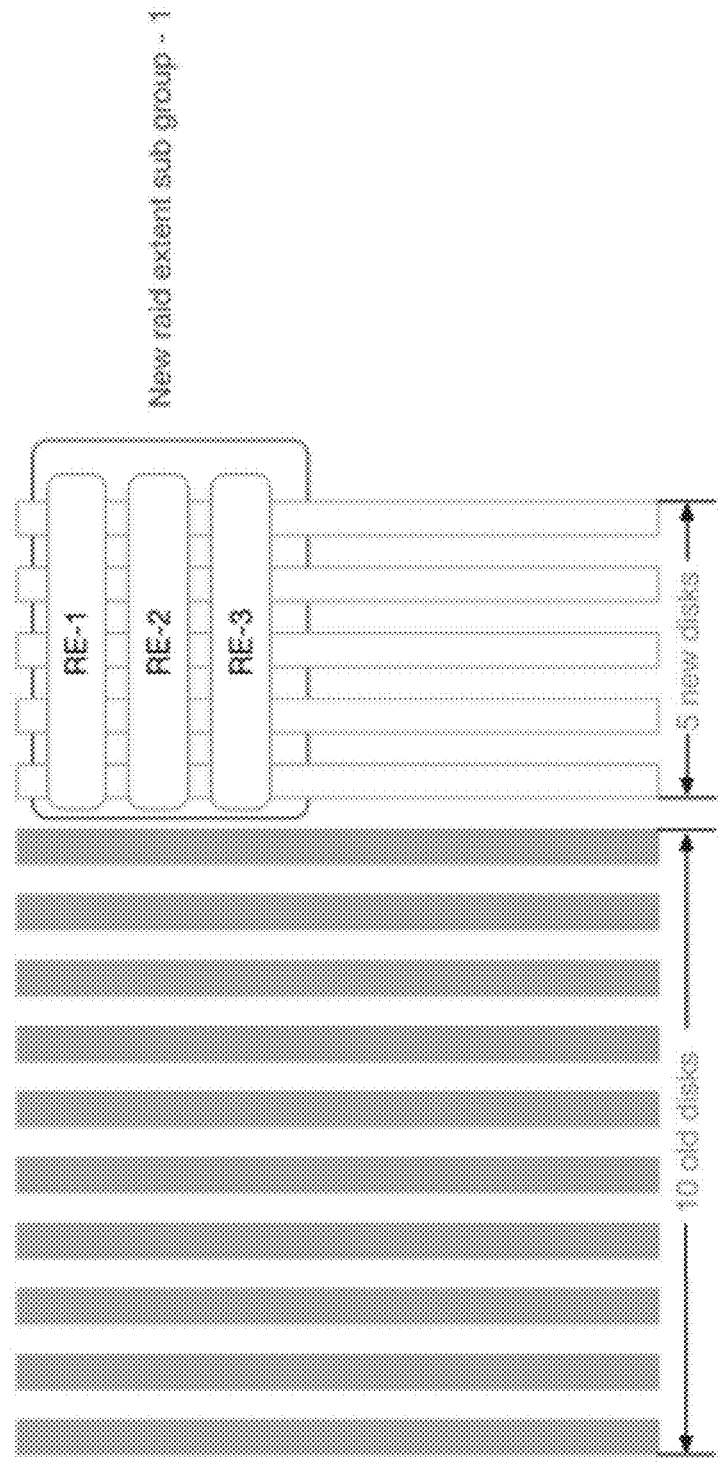
FIG. 12 is an example diagrammatic view of a layout of an overlap introduced by extent pool expansion according to one or more example implementations of the disclosure.

As another example, there may be a case involving disk extent pool expansion. In the example, when expanding one full disk extent pool with a bunch of new disks, to consume these new added capacity, storage management application 21 may create a new Mapped RAID immediately once the expanding is complete. If only the new added disks are free, there may be insufficient free disks to avoid overlap. For instance, and referring at least to FIG. 12, an example layout 1200 of an overlap introduced by extent pool expansion is shown. In this example, the full disk extent pool has 10 disks, and is then expanded with five new disks. So, after the expansion, the disk extent pool has 15 disks. Assume that the RAID extent is a 4+1 R5. When creating the new Mapped RAID, each RAID extent sub group may have three RAID extents (15/3=5), and all new RAID extents may be allocated from the new disks, since all the old disks may be full.

In the disk failure example, after a new disk is swapped to replace the dead disk, storage management application 21 may move some disk extents on the overlapped disk to the new disk to reduce overlap. In the disk extent pool expansion example, after creating the new Mapped RAID, storage management application 21 may also exchange disk extents on the old disk with the one on the new disk, so as to reduce overlap.

Neighborhood Matrix Unbalanced

Figure 13:
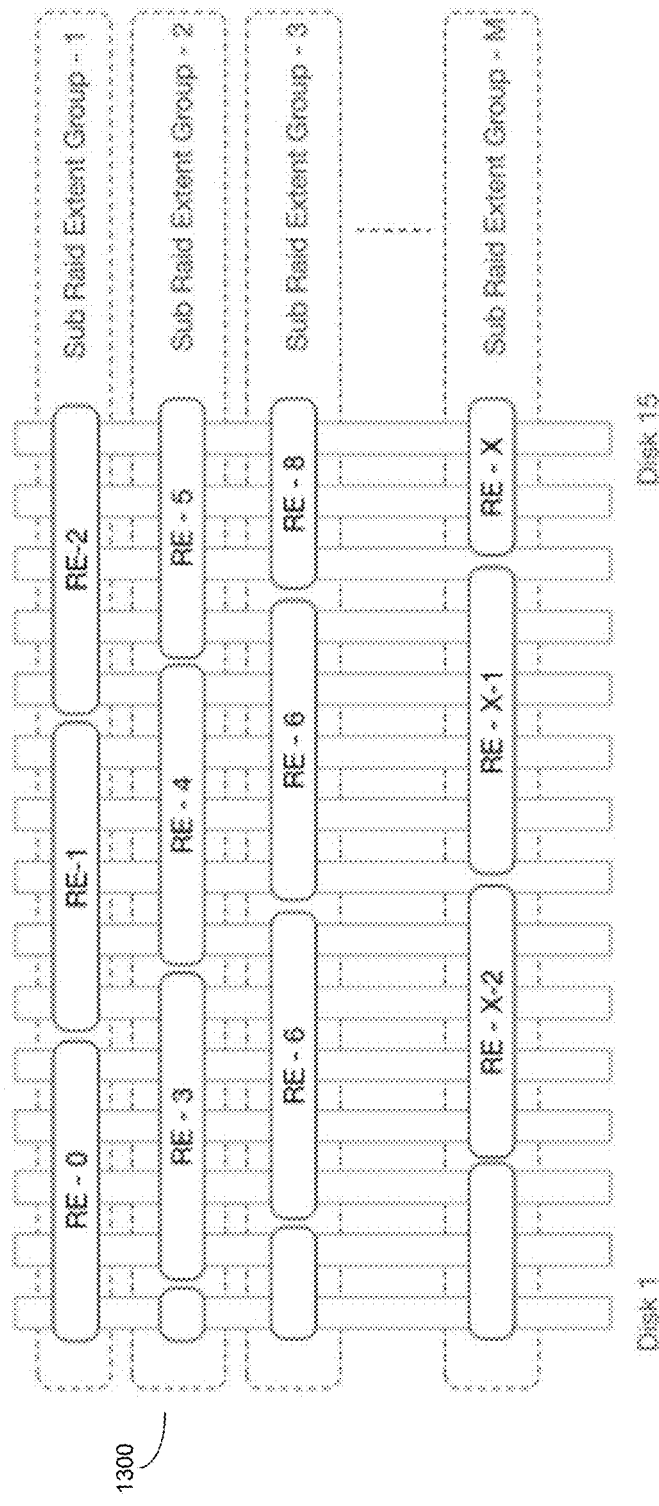
FIG. 13 is an example diagrammatic view of an example RAID extent group layout according to one or more example implementations of the disclosure.
Figure 13:
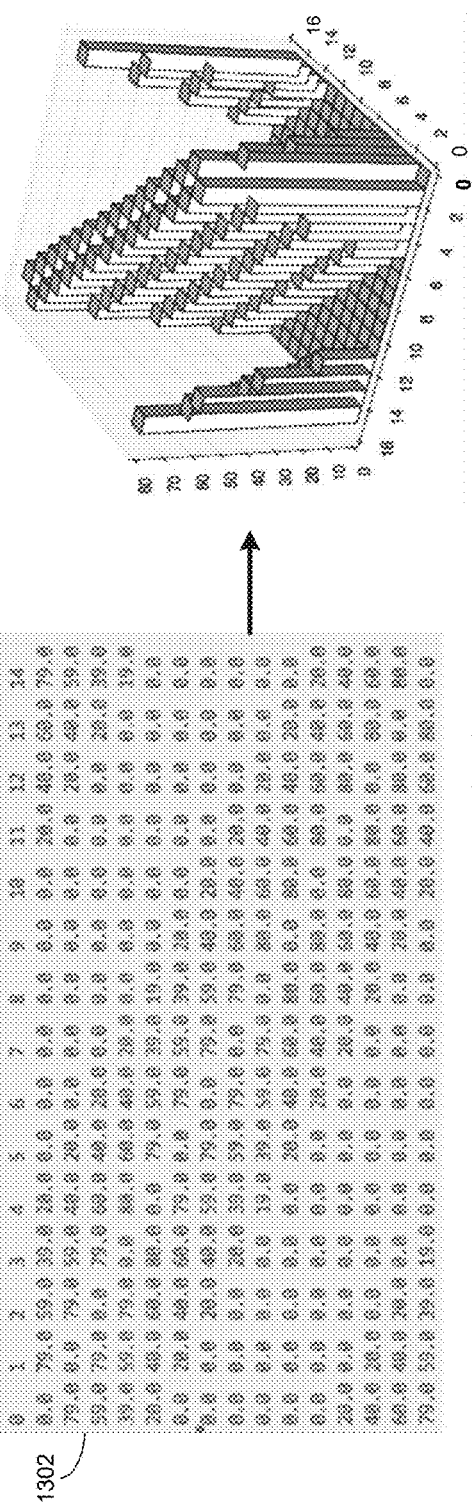
Figure 14:
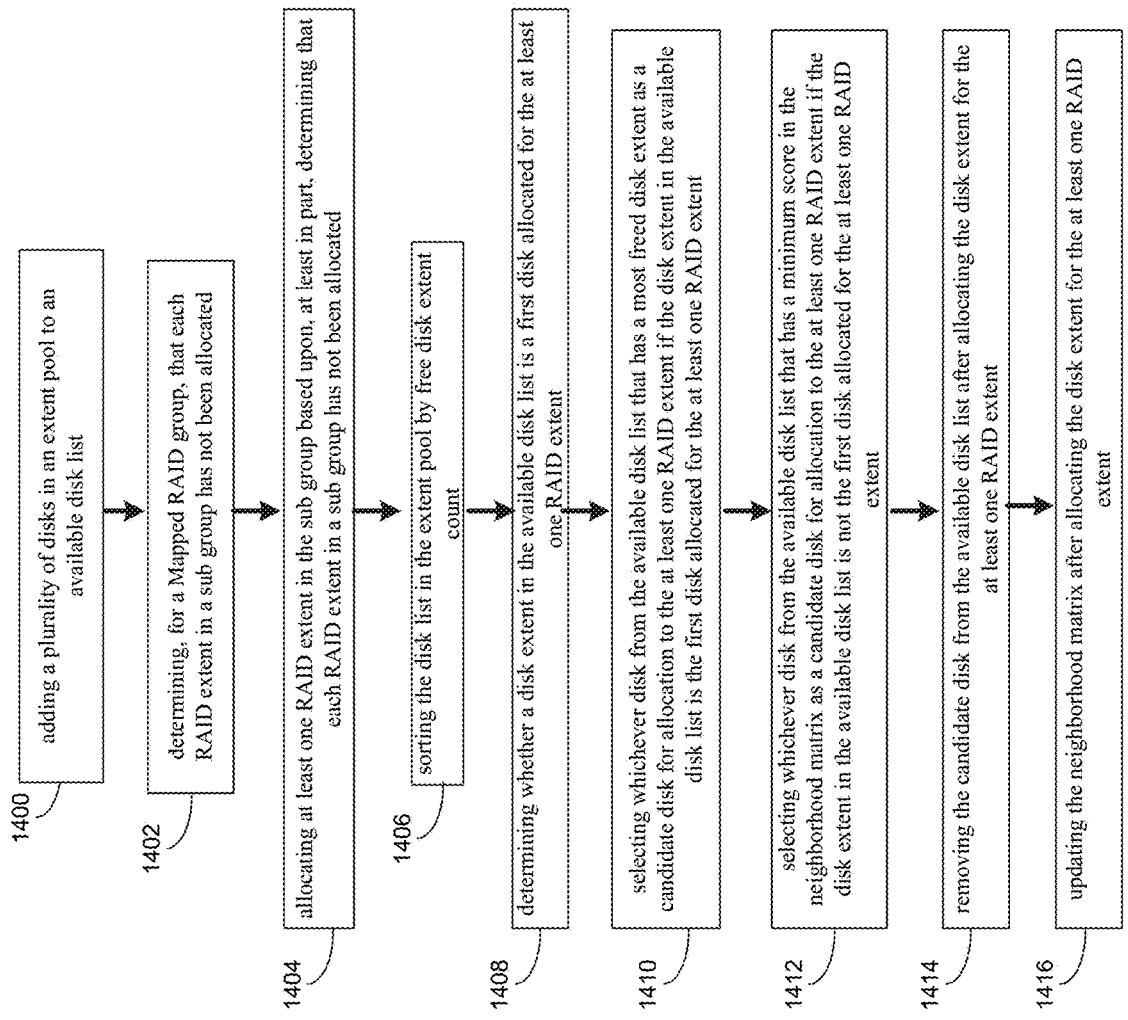
FIG. 14 is an example flowchart of a balance process according to one or more example implementations of the disclosure.
Figure 15:
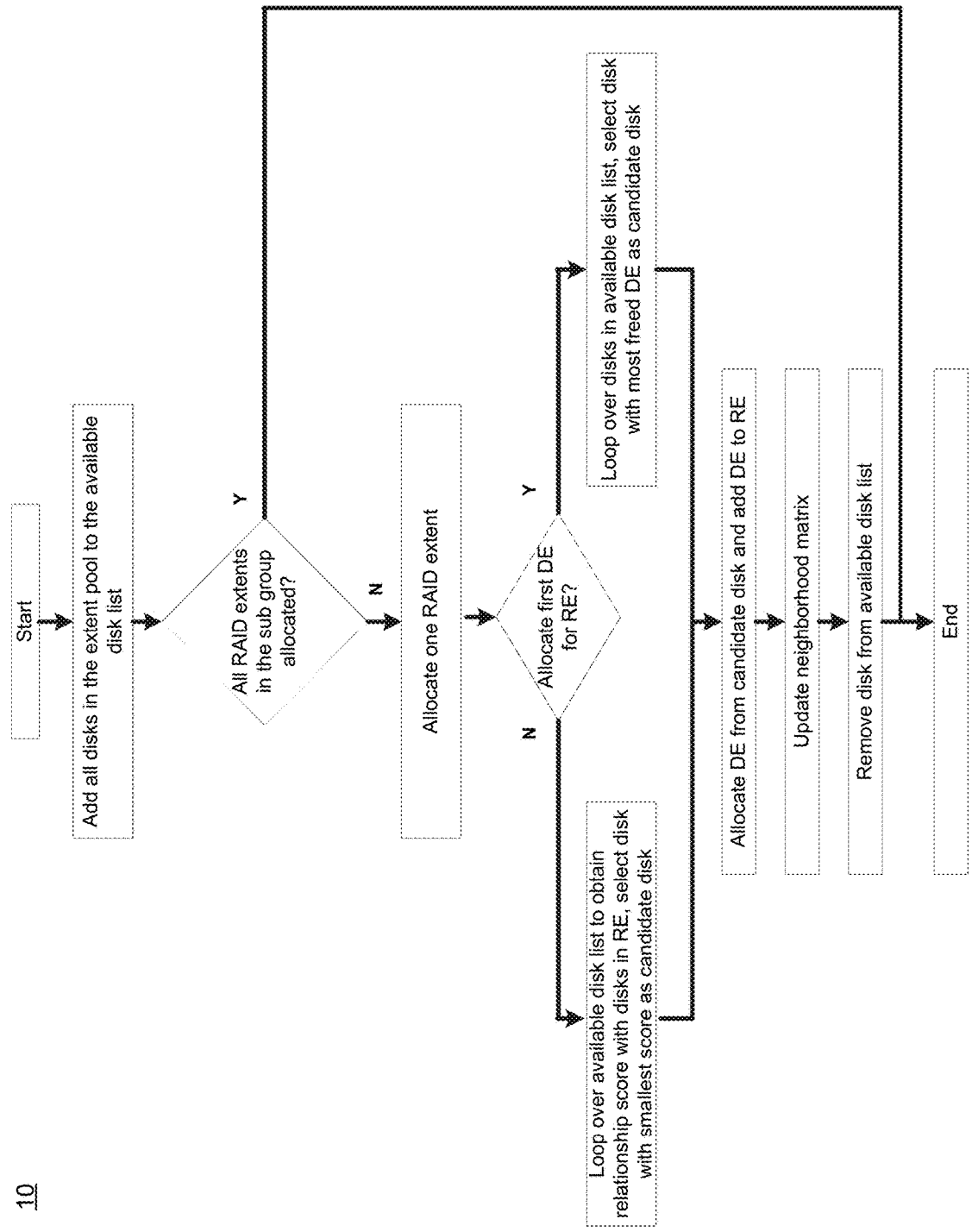
FIG. 15 is an example flowchart of a balance process according to one or more example implementations of the disclosure.

Referring at least to the example implementation of FIG. 13, an example of a bad RAID extent group layout 1300, leading to an unbalanced neighborhood matrix 1302 is shown. In the example, it may be shown a simple way to illustrate keeping disk relationships balanced and avoiding disk overlap in a RAID extent subgroup at the same time. However, by observing the neighborhood matrix, it is clear that it is not balance. In the example, assume each disk has 100 disk extents. Thus, as will be discussed below balance process 10 may use a sophisticated technique to avoid overlaps and keep the neighborhood matrix flat as well.

As will be discussed below, balance process 10 may at least help, e.g., the improvement of an existing storage technology, necessarily rooted in computer technology in order to overcome an example and non-limiting problem specifically arising in the realm of data storage. For instance, balance process 10 may use an efficient process to reduce overlap and keep storage device relationship balance on Mapped RAID.

The Balance Process:

As discussed above and referring also at least to the example implementations of FIGS. 14-18, balance process 10 may add 1400, by a computing device, a plurality of disks in an extent pool to an available disk list, Balance process 10 may determine 1402, for a Mapped RAID group, that each RAID extent in a sub group has not been allocated. Balance process 10 may allocate 1404 at least one RAID extent in the sub group based upon, at least in part, determining that each RAID extent in a sub group has not been allocated.

In some implementations, balance process 10 may add 1400, by a computing device, a plurality of disks in an extent pool to an available disk list. For example, while creating a Mapped RAID, balance process 10 may allocate a plurality of RAID extent sub groups, and then combine the sub groups together into a mapped raid (as noted above). In the example, and referring at least to the example implementation of FIG. 14, 15, and FIG. 16, an example available disk list 1600 is shown. In the example, balance process 10 may loop over a plurality of disks in an extent pool, and may add 1400 some or all of the plurality of disks in the extent pool to available disk list 1600.

In some implementations, balance process 10 may determine 1402, for a Mapped RAID group, that each RAID extent in a sub group has not been allocated. For instance, as noted above, each RAID extent sub group may include several RAID extents. Assume for example purposes only that balance process 10 has determined 1402 that each RAID extent in a particular sub group has not yet been allocated for the Mapped RAID group.

Balance process 10 may allocate 1404 at least one RAID extent in the sub group based upon, at least in part, determining 1402 that each RAID extent in a sub group has not been allocated. For instance, since balance process 10 has determined 1402 that each RAID extent in the particular sub group has not been allocated, balance process 10 may allocate 1404 at least one RAID extent in the sub group, and may be a disk extent from the disks on available disk list 1600.

In some implementations, balance process 10 may sort 1406 the disk list in the extent pool by free disk extent count. For instance, in some implementations, balance process 10 may sort 1406 a disk list in the extent pool by free disk extent count. For instance, balance process 10 may generate and/or obtain a free disk list and may sort 1406 the disk list by free disk extent count (e.g., in decreasing order). In some implementations, balance process 10 may loop over the ordered free disk list, and check if all disks have been checked.

In some implementations, balance process 10 may determine 1408 whether a disk extent in the available disk list is a first disk extent allocated for the at least one RAID extent. For instance, when allocating 1404 at least one RAID extent in the sub group, balance process 10 may determine 1408 whether the at least one RAID extent is the first disk extent allocated for the at least one RAID extent, or if another disk extent has already been allocated for the at least one RAID extent.

In some implementations, whichever disk from the available disk list that has a most freed disk extent may be selected 1410 by balance process 10 as a candidate disk for allocation to the at least one RAID extent if the disk extent in the available disk list is the first disk extent allocated for the at least one RAID extent. For instance, assume for example purposes only that the disk extent in the available disk list is the first disk extent allocated for the at least one RAID extent (e.g., another disk extent has not already been allocated for the at least one RAID extent). In the example, while allocating 1404 the first disk extent for at least one RAID extent, balance process 10 may select 1410 for allocation the first disk extent from the disk (e.g., the candidate disk) with most freed disk extents from the above-noted free disk list.

In some implementations, whichever disk from the available disk list that has a minimum score in the neighborhood matrix may be selected 1412 by balance process 10 as a candidate disk for allocation to the at least one RAID extent if the disk extent in the available disk list is not the first disk extent allocated for the at least one RAID extent. For instance, assume for example purposes only that the disk extent in the available disk list is not the first disk extent allocated for the at least one RAID extent (e.g., another disk extent has already been allocated for the at least one RAID extent). In the example, while allocating 1404 the disk extent for each RAID extent, balance process 10 may select 1410 for allocation the disk extent from the disk (e.g., the candidate disk) with the minimum score, which may be determined based upon the above-noted neighborhood matrix. That is, while allocating the first disk extent for each RAID extent, balance process 10 select 1410 and allocate 1404 the disk extent from the disk with the most free disk extents, but for other disk extents (not the first disk extent) in the RAID extent, balance process 10 may select 1412 and allocate 1404 the disk with the smallest score.

Figure 16:
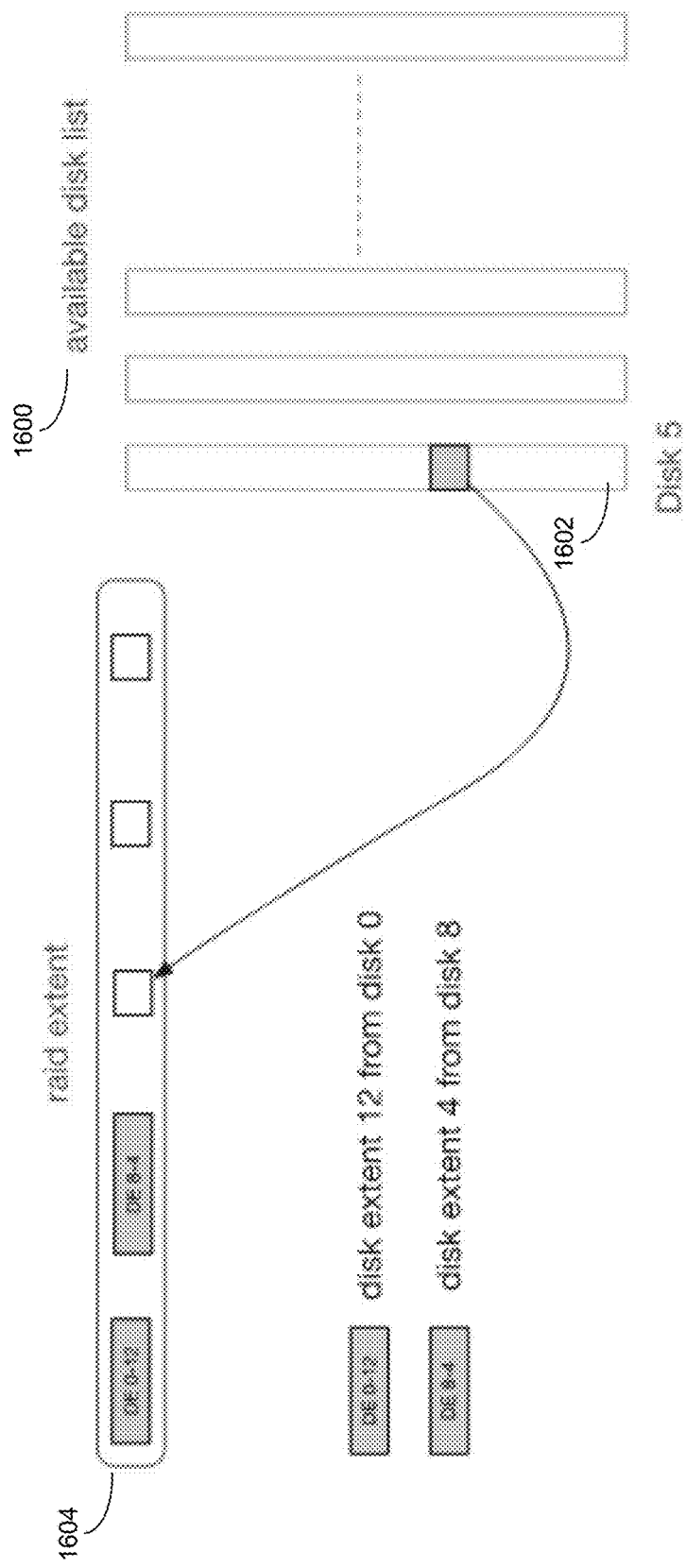
FIG. 16 is an example diagrammatic view of an available disk list according to one or more example implementations of the disclosure.

As noted above, while adding one disk extent to one RAID extent, new disk relationships may be made between these disks. Referring still to FIG. 16, it can be seen that RAID extent 1604 already has two disk extents, which in the example come from disk 0 and disk 8. After allocating a new disk extent from disk 5 and adding it to the RAID extent, new relationships may be made between disk 0, disk 8, and disk 5. In some implementations, to evaluate the relationships between disks in the available disk list and disks already in the RAID extent, balance process 10 may use a score, which may be determined by example only as follows:

$$SCORE = \text{sum}(NW(i,x)), \text{ where } i \in \text{RAID extent and } x$$
is the disk index in the available disk list.

In the example, balance process 10 may sum the neighborhood matrix value between the candidate disk in the available disk list and all the disks already in the RAID extent. Generally, a large score may indicate that these disks already have a strong relationship, and a small score may generally indicate that the relationships between these disks are still week. As such, balance process 10 may allocate disk extents from the disk with the smallest score, since after that balance process 10 may strengthen the relationship between these disks.

In some implementations, balance process 10 may remove 1414 the candidate disk from the available disk list after allocating 1404 the disk extent for the at least one RAID extent. For instance, assume for example purposes only that disk 5 (e.g., disk 1602) is the disk from which the disk extent has been selected and allocated 1404 for the at least one RAID extent (e.g., RAID extent 1604). In the example, once balance process 10 has allocated 1404 a disk extent from one of the disks (e.g., disk 1602), that disk may be removed 1414 from the available disk list. In the example, by maintaining the available disk list, balance process 10 may help void overlap, and by using a scoring system while selecting the candidate disk to allocate a disk extent, balance process 10 may help keep the neighborhood matrix balanced.

In some implementations, balance process 10 may update 1416 the neighborhood matrix after allocating 1404 the disk extent for the at least one RAID extent. For example, once the allocation 1404 is complete, balance process 10 may update 1416 the neighborhood matrix, which should result in the numbers in the matrix being closer to each other.

Figure 17A:
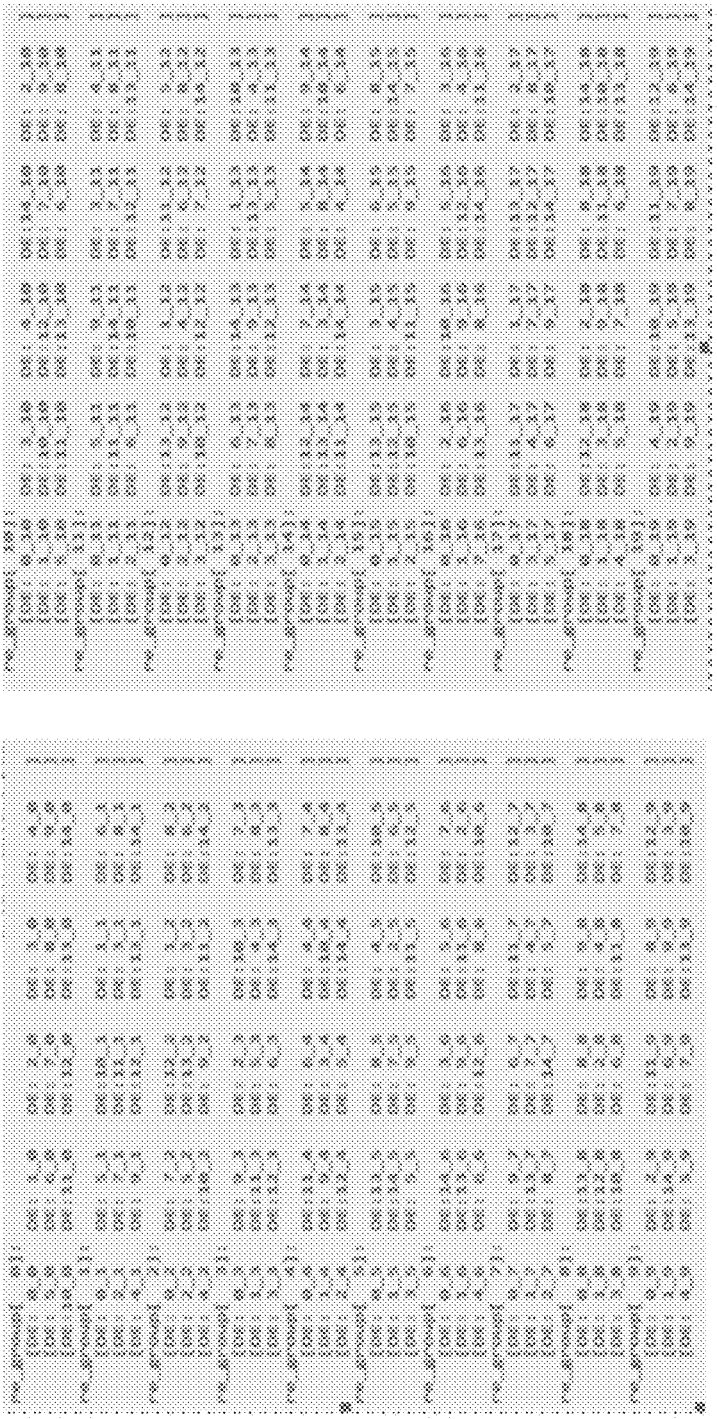
FIGS. 17*a*-17*b* is an example diagrammatic view of a extent sub group composition according to one or more example implementations of the disclosure.
Figure 17B:
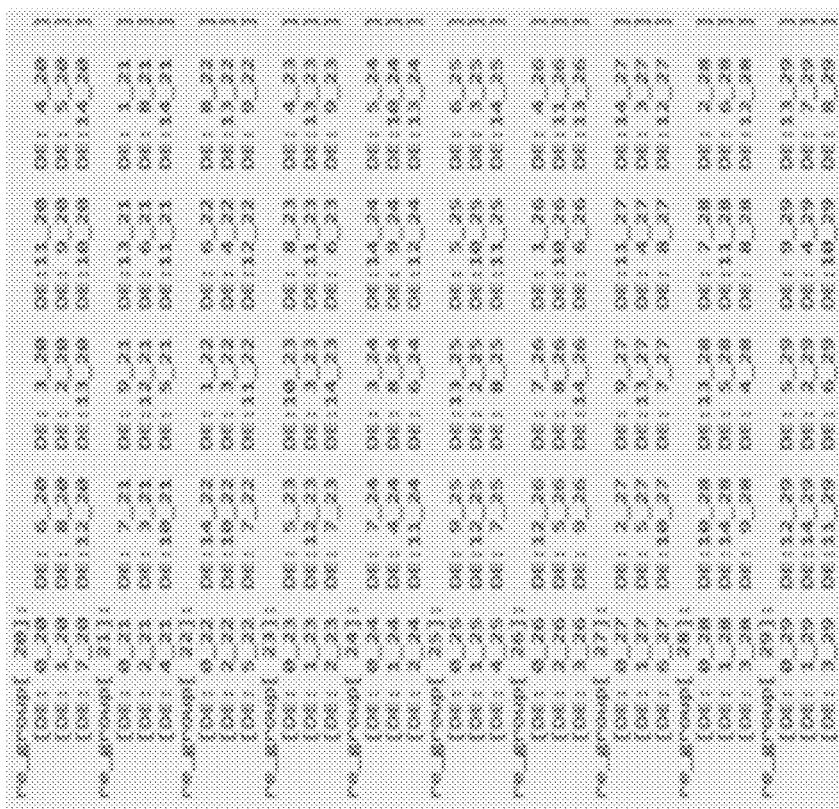
Figure 18:
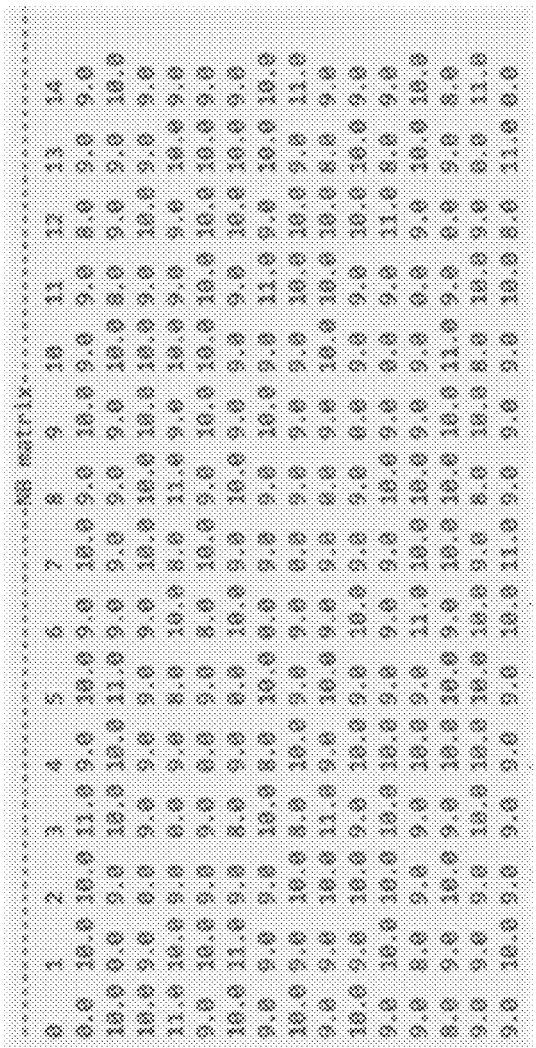
FIG. 18 is an example diagrammatic view of a neighborhood matrix according to one or more example implementations of the disclosure.
Figure 18:
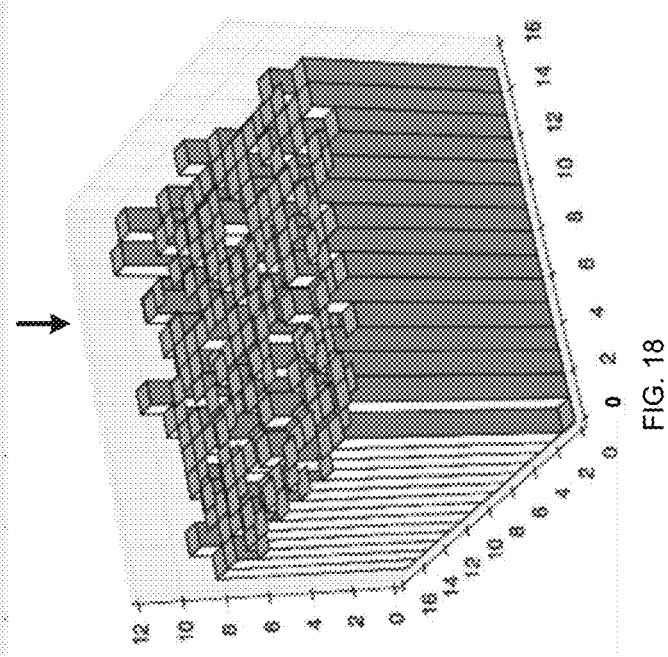

As an example, and referring at least to the example implementation of FIG. 17a, FIG. 17b, and FIG. 18, an example RAID extent sub group composition 1700a for Mapped RAID, and a neighborhood matrix 1800 is shown. In the example, assume that to create one Mapped RAID over 15 disks, that the Mapped RAID includes 30 RAID extent groups and each RAID extent group includes 3 RAID extents, and each RAID extent is a 4+1 R5. After applying the teachings of the present disclosure while creating a RAID extent sub group (that may also be required by the example rotation algorithm in Mapped RAID), RAID extent sub group composition 1700a for Mapped RAID has avoided any disk overlaps in each sub group, and neighborhood matrix 1800 is relatively "flat."

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    adding, by a computing device, a plurality of disks in an extent pool to an available disk list;
    determining, for a Mapped RAID group, that each RAID extent in a sub group has not been allocated;
    sorting the disk list in the extent pool by free disk extent count;
    determining whether a disk extent in the available disk list is a first disk extent allocated for the at least one RAID extent;
    selecting whichever disk from the available disk list that has a most freed disk extent as a candidate disk for allocation to the at least one RAID extent if the disk extent in the available disk list is the first disk extent allocated for the at least one RAID extent;
    selecting whichever disk from the available disk list that has a minimum score in a neighborhood matrix as a candidate disk for allocation to the at least one RAID extent if the disk extent in the available disk list is not the first disk extent allocated for the at least one RAID extent, wherein the neighborhood matrix indicates how many times a disk extent from a respective disk is combined with a disk extent from another disk in a RAID extent; and
    allocating at least one RAID extent in the sub group based upon, at least in part, determining that each RAID extent in a sub group has not been allocated.

2. The computer-implemented method of claim 1 further comprising removing the candidate disk from the available disk list after allocating the disk extent for the at least one RAID extent.

3. The computer-implemented method of claim 1 further comprising updating the neighborhood matrix after allocating the disk extent for the at least one RAID extent.

4. A computer program product residing on a non-transitory computer readable storage medium having a plurality of instructions stored thereon which, when executed across one or more processors, causes at least a portion of the one or more processors to perform operations comprising:
    adding a plurality of disks in an extent pool to an available disk list;
    determining, for a Mapped RAID group, that each RAID extent in a sub group has not been allocated;
    sorting the disk list in the extent pool by free disk extent count;
    determining whether a disk extent in the available disk list is a first disk extent allocated for the at least one RAID extent;
    selecting whichever disk from the available disk list that has a most freed disk extent as a candidate disk for allocation to the at least one RAID extent if the disk extent in the available disk list is the first disk extent allocated for the at least one RAID extent;
    selecting whichever disk from the available disk list that has a minimum score in a neighborhood matrix as a candidate disk for allocation to the at least one RAID extent if the disk extent in the available disk list is not the first disk extent allocated for the at least one RAID extent, wherein the neighborhood matrix indicates how many times a disk extent from a respective disk is combined with a disk extent from another disk in a RAID extent; and allocating at least one RAID extent in the sub group based upon, at least in part, determining that each RAID extent in a sub group has not been allocated.

5. The computer program product of claim 4 further comprising removing the candidate disk from the available disk list after allocating the disk extent for the at least one RAID extent.

6. The computer program product of claim 4 further comprising updating the neighborhood matrix after allocating the disk extent for the at least one RAID extent.

7. A computing system including one or more processors and one or more memories configured to perform operations comprising:

adding a plurality of disks in an extent pool to an available disk list;

determining, for a Mapped RAID group, that each RAID extent in a sub group has not been allocated;

sorting the disk list in the extent pool by free disk extent count;

determining whether a disk extent in the available disk list is a first disk extent allocated for the at least one RAID extent;

selecting whichever disk from the available disk list that has a most freed disk extent as a candidate disk for allocation to the at least one RAID extent if the disk extent in the available disk list is the first disk extent allocated for the at least one RAID extent;

selecting whichever disk front the available disk list that has a minimum score in a neighborhood matrix as a candidate disk for allocation to the at least one RAID extent if the disk extent in the available disk list is not the first disk extent allocated for the at least one RAID extent, wherein the neighborhood matrix indicates how many times a disk extent from a respective disk is combined with a disk extent from another disk in a RAID extent; and allocating at least one RAID extent in the sub group based upon, at least in part, determining that each RAID extent in a sub group has not been allocated.

8. The computing system of claim 7 further comprising removing the candidate disk from the available disk list after allocating the disk extent for the at least one RAID extent.

9. The computing system of claim 7 further comprising updating the neighborhood matrix after allocating the disk extent for the at least one RAID extent.

* * * * *